(12) United States Patent
Wu et al.

(10) Patent No.: US 11,238,780 B2
(45) Date of Patent: Feb. 1, 2022

(54) DISPLAYS WITH MOVABLE PRIVACY GATES

(71) Applicant: Hewlett-Packard Development Company, L.P., Spring, TX (US)

(72) Inventors: Kuan-Ting Wu, Taipei (TW); Wei-Chung Chen, Taipei (TW); Hui He, Fort Collins, CO (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/648,796

(22) PCT Filed: Oct. 13, 2017

(86) PCT No.: PCT/US2017/056435
§ 371 (c)(1),
(2) Date: Mar. 19, 2020

(87) PCT Pub. No.: WO2019/074513
PCT Pub. Date: Apr. 18, 2019

(65) Prior Publication Data
US 2020/0241284 A1 Jul. 30, 2020

(51) Int. Cl.
*G09G 3/32* (2016.01)
*G02B 26/08* (2006.01)

(52) U.S. Cl.
CPC ............ *G09G 3/32* (2013.01); *G02B 26/0808* (2013.01); *G09G 2320/028* (2013.01); *G09G 2320/068* (2013.01); *G09G 2358/00* (2013.01)

(58) Field of Classification Search
CPC ..... G09G 3/32–3291; G09G 2300/046; G09G 2300/0465; G09G 2310/0232; G09G 2320/028; G09G 2320/068; G09G 2358/00; G02B 26/08; G02B 26/0808
See application file for complete search history.

(56) References Cited

U.S. PATENT DOCUMENTS

| | | | |
|---|---|---|---|
| 5,528,319 A | 6/1996 | Austin | |
| 2010/0225639 A1* | 9/2010 | Kubis | G09F 19/18 345/214 |
| 2012/0050342 A1* | 3/2012 | Huang | G09G 3/342 345/690 |
| 2012/0287508 A1 | 11/2012 | Muneyoshi et al. | |
| 2013/0120466 A1 | 5/2013 | Chen et al. | |

(Continued)

FOREIGN PATENT DOCUMENTS

| | | |
|---|---|---|
| CN | 104864364 | 8/2015 |
| CN | 206022367 | 3/2017 |

(Continued)

OTHER PUBLICATIONS

Davies, N. et al, "Personalisation and privacy in future pervasive display networks", 2014, 10 pages.

*Primary Examiner* — Nathan Danielsen
(74) *Attorney, Agent, or Firm* — Dierker & Kavanaugh PC

(57) ABSTRACT

In one example, a display is described, which may include a plurality of spaced light emitting device packages, a privacy gate having partition walls to partition each of the plurality of spaced light emitting device packages, and a control unit to selectively move the partition walls up or down relative to the plurality of spaced light emitting device packages to control a viewing angle of the display.

11 Claims, 8 Drawing Sheets

(56) References Cited

U.S. PATENT DOCUMENTS

| | | | | |
|---|---|---|---|---|
| 2014/0104243 A1* | 4/2014 | Sakariya | ................... | G06F 3/14 345/204 |
| 2016/0019834 A1* | 1/2016 | Hall | ......................... | G06F 1/20 345/212 |
| 2016/0179231 A1 | 6/2016 | Kwak et al. | | |
| 2016/0225343 A1 | 8/2016 | Ek et al. | | |

FOREIGN PATENT DOCUMENTS

| | | |
|---|---|---|
| CN | 106594537 | 7/2017 |
| JP | 2005078093 | 3/2005 |
| JP | 2005221756 | 8/2005 |
| JP | 2006084876 | 3/2006 |
| JP | 2009267164 | 11/2009 |
| JP | 2010506195 | 2/2010 |
| KR | 20080013284 B1 | 2/2008 |
| KR | 101265727 B1 | 5/2013 |
| WO | WO-16062834 | 4/2016 |
| WO | WO-16083289 | 6/2016 |
| WO | WO-2017014564 | 1/2017 |
| WO | WO-2017156700 | 9/2017 |
| WO | WO-2018236387 | 12/2018 |

* cited by examiner

DISPLAYS WITH MOVABLE PRIVACY GATES

BACKGROUND

The emergence and popularity of mobile computing has made electronic devices, due to their compact design and light weight, a staple in today's marketplace. Electronic devices, such as mobile phones, notebooks and tablets, may include a display that outputs information to users. Example display may include a micro-light-emitting diode (micro-LED or μLED) display. Micro-LED displays may have arrays of microscopic LEDs forming the individual pixel elements. The users may use the display to view private information, such as private financial information or a confidential email. Because of the increased portability of electronic devices, users can transport and use the electronic devices in public areas where privacy is minimal.

BRIEF DESCRIPTION OF THE DRAWINGS

Examples are described in the following detailed description and in reference to the drawings, in which.

DETAILED DESCRIPTION

Electronic devices, such as mobile phones, notebooks and tablets, may include a display that outputs information to users. The users may use the display to view private information, such as private financial information or a confidential email. Often, the user may be in public, such as when the user is sitting in a waiting room, standing in line, or riding on public transportation. In such situations, other people may view the display of the users electronic device, particularly when the user's electronic device includes a display viewable from a wide variety of angles. In some cases, detachable privacy screens may be used at display devices to restrict propagation direction of light emitted from the display device. In such cases, the use of privacy screens may inhibit or reduce functionality of a touch screen associated with the display device.

Examples described herein may provide a display including a plurality of spaced light emitting device packages. Example display may include a micro-light-emitting diode (micro-LED) display, a micro-electro-mechanical systems (MEMS) display, or the like. Micro-LED display, also known as m-LED or μ-LED, is an emerging flat panel display technology having arrays of microscopic LEDs that form the individual pixel elements. Each light emitting device package may include at least one micro-LED, Further, the display may include a privacy gate having partition walls to partition each of the plurality of spaced light emitting device packages. Further, the display may include a control unit to selectively move the partition walls up or down relative to the plurality of spaced light emitting device packages to control a viewing angle of the display.

Examples described herein may provide a switchable privacy control on the display to control the viewing angle and protect the display from prying eyes. In this case, the privacy gate (e.g., an ultrathin privacy gate) can be moved up or down to change the light direction when the user selects the privacy mode. Thus, sensitive data and information, such as insurance, banking, finance, human resources, trade, examination rooms, medical personnel, and security applications can be protected from the prying eyes.

Examples described herein may provide a 2-way or a 4-way privacy control (i.e., a horizontal viewing angle control and/or a vertical viewing angle control). Examples described herein may also provide a multi-mode privacy control. For example, a degree of privacy on the display can be controlled by moving the ultrathin privacy gate relative to the light emitting device packages to multiple positions corresponding to multiple privacy modes.

Figure 1A:
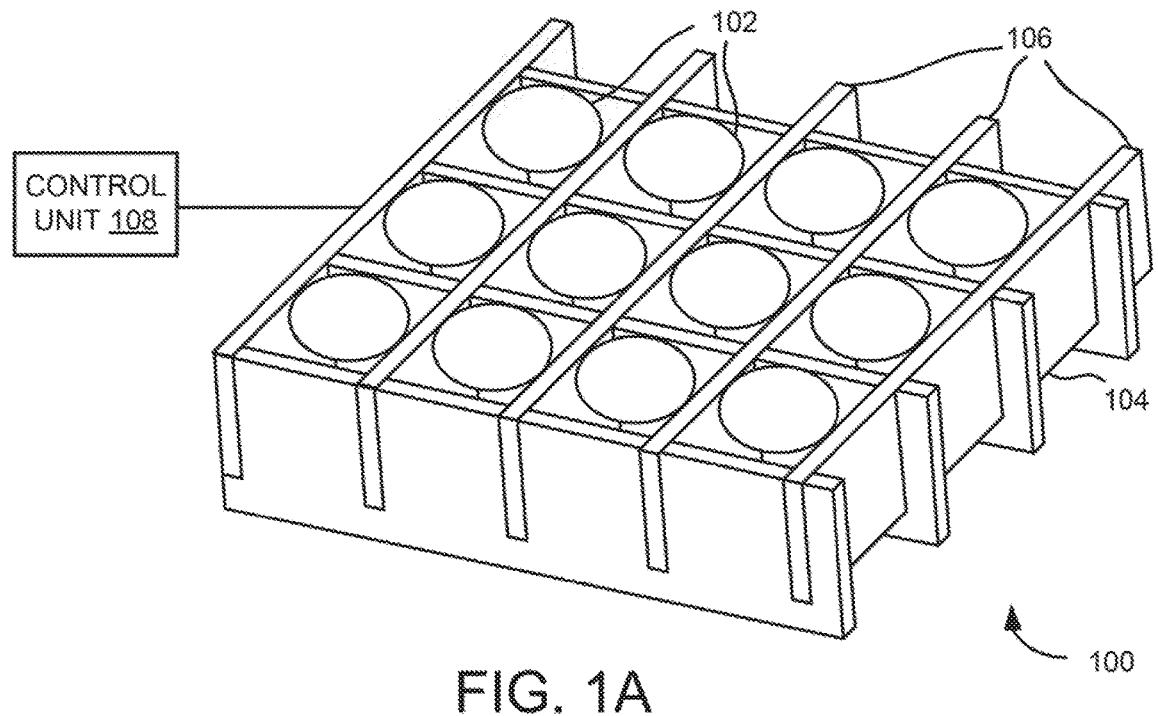
FIG. 1A is a perspective view of an example display, depicting a privacy gate.

FIG. 1A is a perspective view of an example display 100, depicting a privacy gate 104. Display 100 may be an external display to a computing device, an internal display to the computing device, or any combination thereof. Example display may include a touchscreen display. In one example, display 100 may include a plurality of spaced light emitting device packages 102, for instance, integrated to a circuit board of display 100. In one example, spaced light emitting device packages 102 may be arranged in columns and rows. In another example, light emitting device packages 102 may be uniformly arranged.

For example, display 100 may refer to a display device that outputs data via an array of pixel elements. In such cases, light emitting device packages 102 may include at least one semiconductor device that produces light when the appropriate electrical bias is provided. For example, each light emitting device package 102 may include at least one μLED pixel that can be driven to emit light. A pixel may refer to a component of display 100 that can be used to build the image. For example, each μLED pixel may include a red pixel, a green pixel, a blue pixel, or any combination thereof, which can be independently controlled to produce a range of colors.

Example display 100 may include privacy gate 104 having partition walls 106 to partition each of spaced light emitting device packages 102. Example privacy gate 104 may be an ultrathin privacy gate. In one example, privacy gate 104 may be disposed on light emitting device packages 102 such that the light can be emitted through partition walls 106. Example display 100 may include a control unit 108 to selectively move partition walls 106 up or down relative to light emitting device packages 102 to control a viewing angle of display 100.

Figure 1B:
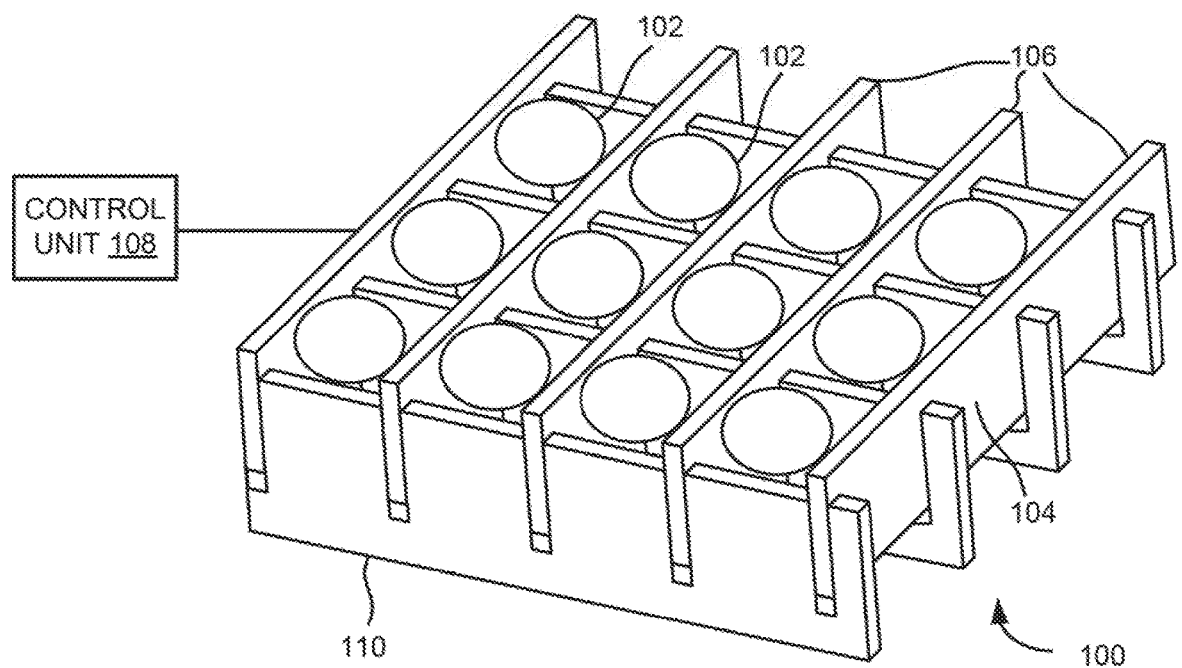
FIG. 1B is a perspective view f the example display of FIG. 1A, depicting an upward movement of the privacy gate to control a viewing angle of the display.

FIG. 1B is a perspective view of example display 100 of FIG. 1A, depicting an upward movement of privacy gate 104 to control a viewing angle of display 100. As shown in FIG. 1B, privacy gate 104 may be a grid shaped structure having a plurality of columns of partition walls 106 disposed by means of a supporting framework 110 to partition spaced light emitting device packages 102. Each light emitting device package 102 may be accommodated in a respective space defined between the columns of partition walls 106. In one example, control unit 108 may move partition walls 106 up or down relative to supporting framework 110 to provide a two-way privacy control of the viewing angle of display 100, In one example, two-way privacy control may include a horizontal viewing angle control of display 100.

Figure 1C:
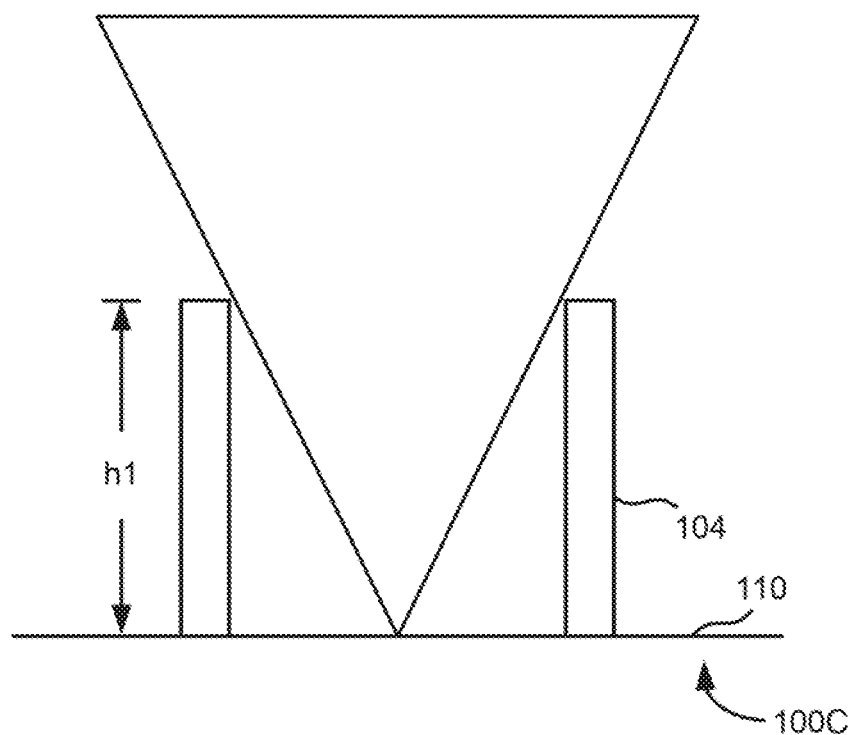
FIGS. 1C and 1D are example schematic diagrams illustrating a wide viewing angle and a narrow viewing angle of the display corresponding to FIGS. 1A and 1B, respectively.
Figure 1D:
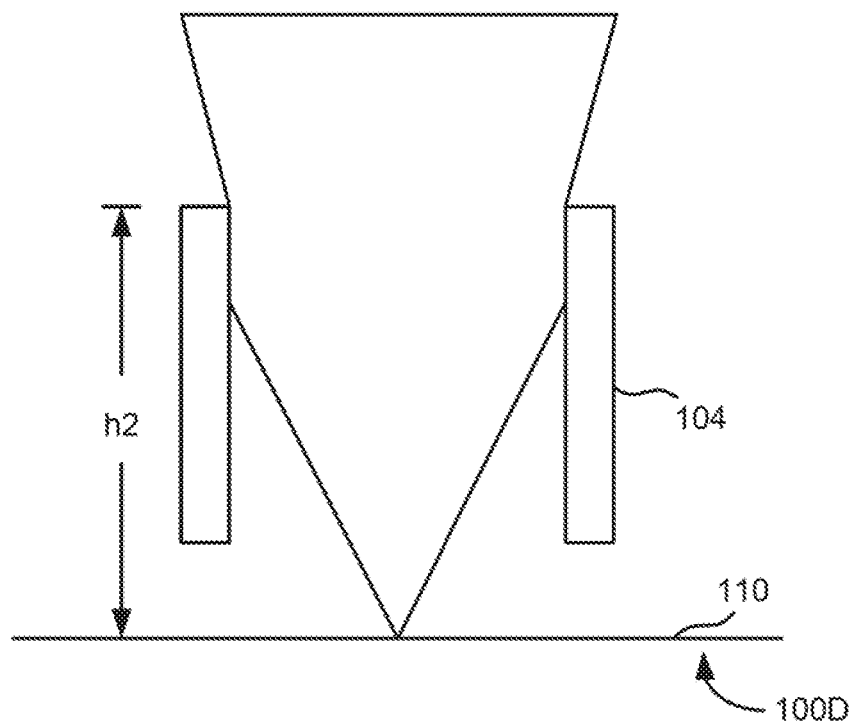

FIG. 1C is an example schematic diagram 1000 illustrating a wide viewing angle of display 100 when display 100 is operated in a normal mode. In FIG. 1C, privacy gate 104 is in a first position (e.g., having height h1) with respect to supporting framework 110. FIG. 1D is an example schematic diagram 100D illustrating a narrow viewing angle of display 100 when display 100 is operated in a privacy mode.

As shown in FIG. 10, privacy gate 104 may be upwardly moved to a second position (e.g., having height, h2, h2>h1) with respect to supporting framework 110 to change the light direction of μ-LED pixels and narrow down the viewing angle of display 100. In this example, partition walls 106 may obstruct a portion of light from light emitting device packages 102 to narrow down the viewing angle of display 100.

The privacy mode may be activated explicitly by the user or may be activated in response to a privacy mode trigger event. In one example, touchscreen may be used to detect a gesture to activate and/or de-activate the privacy mode. In another example, the privacy mode may be activated and/or deactivated via a keyboard and/or keypad. In yet another example, microphone in display 100 may be used to detect a spoken command to activate the privacy mode. In yet another example, the privacy mode or the normal mode may be manually selected by a user. In yet another example, the privacy mode or the normal mode may be automatically detected based on user gestures through at least one sensor disposed in display 100. Example sensor may include a camera.

Thus, privacy gate 104 may be moved up or down with respect to supporting framework 110 to switch the viewing angle between the wide viewing angle and the narrow viewing angle. The wide viewing angle may refer to a maximum angle at which information/content displayed on display 100 can be viewed. The wide viewing angle may be greater than the narrow viewing angle. During privacy mode of operation, the viewing angle (e.g., range of viewing the sensitive information on display 100) may need to be restricted to prevent other users from viewing display 100. In this case, the viewing angle of display 100 may be switched to the narrow viewing angle to enable privacy of the information/content displayed on display 100, During normal mode of operation, the viewing angle of display 100 may be switched to the wide viewing angle.

Figure 2A:
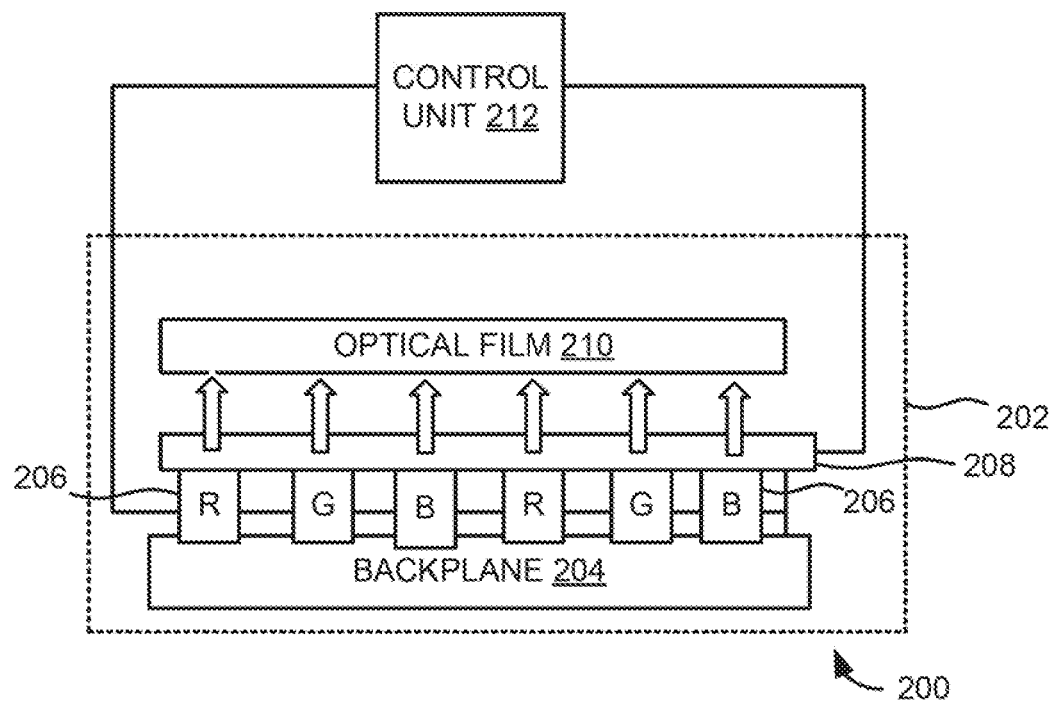
FIG. 2A is a schematic representation of an example electronic device, depicting a privacy gate to control a viewing angle of a display of the electronic device.

FIG. 2A is a schematic representation of an example electronic device 200, depicting a privacy gate 208 to control a viewing angle of a display 202 of electronic device 200. Example electronic device 200 may include a mobile communication device, such as a smart phone, a laptop, a tablet, a convertible device that can be used in both laptop and tablet modes, a media playing device, a portable gaming system, and/or any other type of portable computer device with a screen that displays visual data. Example display 202 may include a liquid crystal display (LCD), light emitting diode (LED) display, μ-LED display, MEMS display, or other displays that includes arrays of LED packages (e.g., LEDs). A micro-LED (μ-LED) may be considered as a type of LED. Electronic device 200 may be equipped with other components such as a camera, audio/video devices, and the like, depending on the functions of electronic device 200.

Example electronic device 200 may include display 202 and a control unit 212 communicatively connected to display 202. In one example, control unit 212 can be implemented as a part of display 202, for instance, in case of tablet computers. In another example, control unit 212 can be implemented as a part of a base housing (e.g., that houses battery, touchpad, keyboard and the like) of electronic device 200 and communicatively connected to display 202, for instance, in case of notebook computers.

Display 202 may include a backplane 204 equipped with arrays of spaced LED packages 206. For example, each LED package 206 may include a red μ-LED, a green μ-LED, a blue μ-LED, or any combination thereof. Further, display 202 may include privacy gate 208 having partition walls to partition each of arrays of spaced LED packages. In one example, privacy gate 208 may be a grid shaped structure formed by a plurality of intersecting rows and columns of the partition walls. Each LED package 206 may be accommodated in a respective, space defined by the intersecting rows and columns of the partition walls.

Figure 2B:
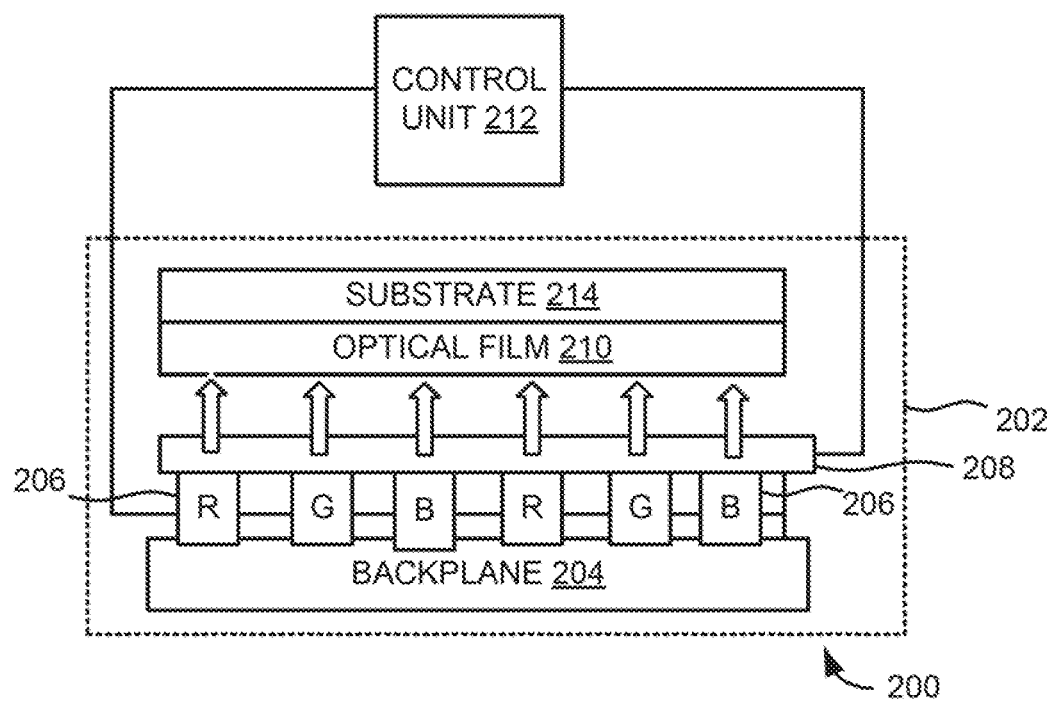
FIG. 2B is a schematic representation of the example electronic device of FIG. 2A, depicting additional components of the display.

Furthermore, display 202 may include an optical film disposed above privacy gate 208 such that privacy gate 208 can be moved up and down between optical film 210 and backplane 204. In some examples, optical film 210, backplane 204, and privacy gate 208 are parallel to each other. Example optical film 210 may include an asymmetric turning film, an asymmetrical prism film, a prism film, a brightness enhancement film (BEE), a dual brightness enhancement film (DBEF), a diffuser, a polarizer film, a retardation film, or any combination thereof. As shown in FIG. 2B, display 202 may include a substrate 214 disposed on optical film 210. Example substrate 214 may be a glass substrate or a plastic substrate. In some examples, display 202 may include a touchscreen that includes a display and an input device configured to detect a user's touch. In addition, optical film 210 can be placed on example substrate 214.

During operation, control unit 212 may selectively move the partition walls up or down relative to spaced LED packages 206 to control a viewing angle of display 202. In one example, control unit 212 may control a degree of privacy on display 202 by moving privacy gate 208 to multiple positions corresponding to multiple privacy modes. Each privacy mode may have a viewing angle that is different from the other privacy modes.

In one example, control unit 212 may move the partition walls corresponding to the columns up or down relative to arrays of spaced LED packages 206 to control a horizontal viewing angle of display 202. This is explained in FIG. 3A. In another example, control unit 212 may move the partition walls corresponding to the rows up or down relative to arrays of spaced LED packages 206 to control a vertical viewing angle of display 202. In yet another example, control unit 212 may move the partition walls corresponding to the rows and columns up or down relative to arrays of spaced LED packages 206 to control the horizontal viewing angle and the vertical viewing angle of display 202.

Figure 3A:
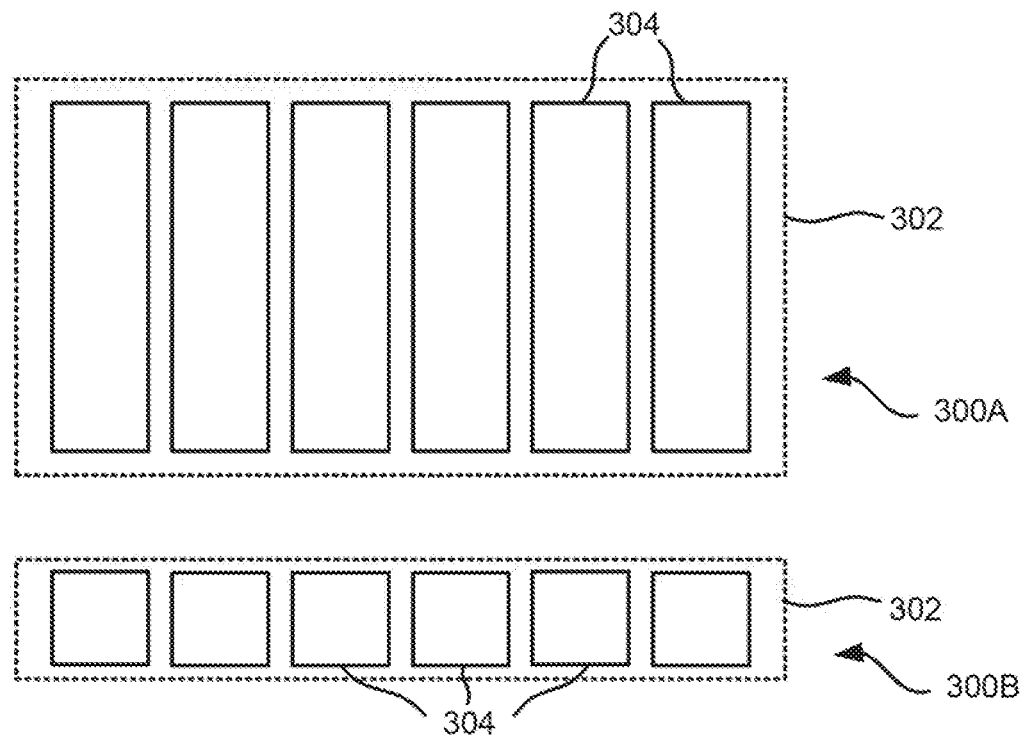
FIGS. 3A and 3B depict example schematic views of the privacy gate including a plurality of columns of partition walls that can be moved up or down to provide a two-way privacy control.
Figure 3B:
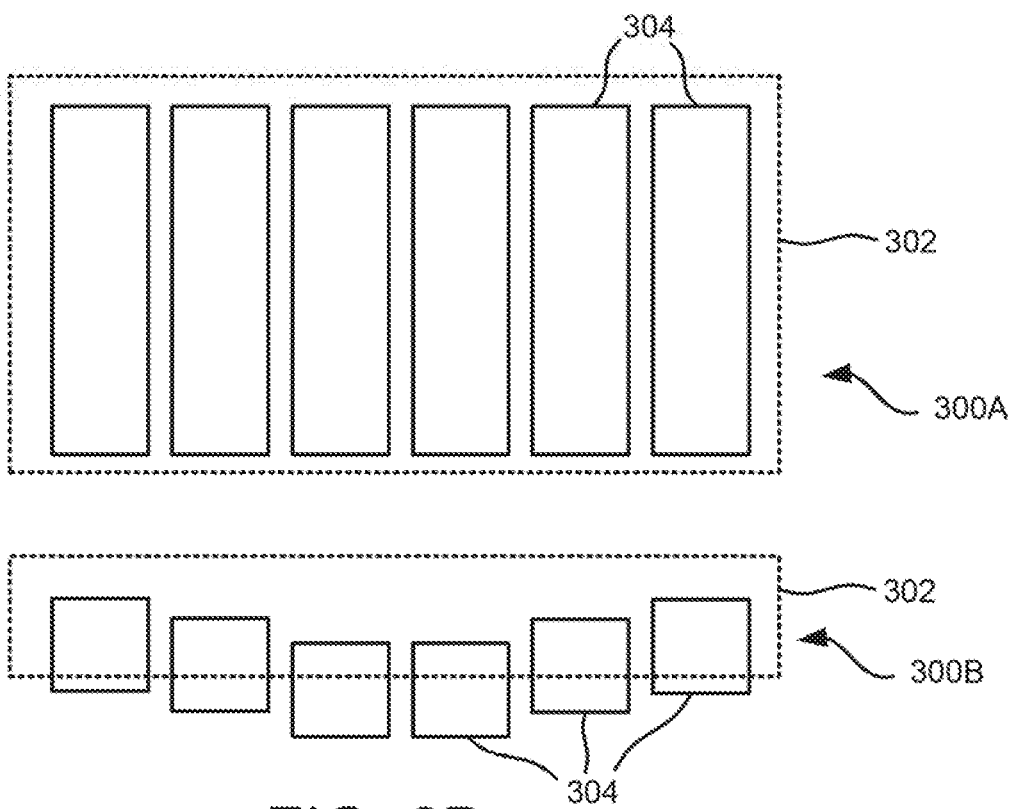

FIGS. 3A and 3B depict, example schematic views of a privacy gate 208 including a plurality of columns 304 of partition walls that can be moved up or down to provide a two-way privacy control. Particularly, FIGS. 3A and 3B illustrate a top view 300A and a front view 300B of privacy gate 208. As shown in FIG. 3A, privacy gate 208 may be a grid shaped structure having columns 304 of the partition walls disposed by means of a supporting framework 302 to partition LED packages 206. Each LED package may be accommodated in a respective space defined between columns 304 of the partition walls.

Figure 3C:
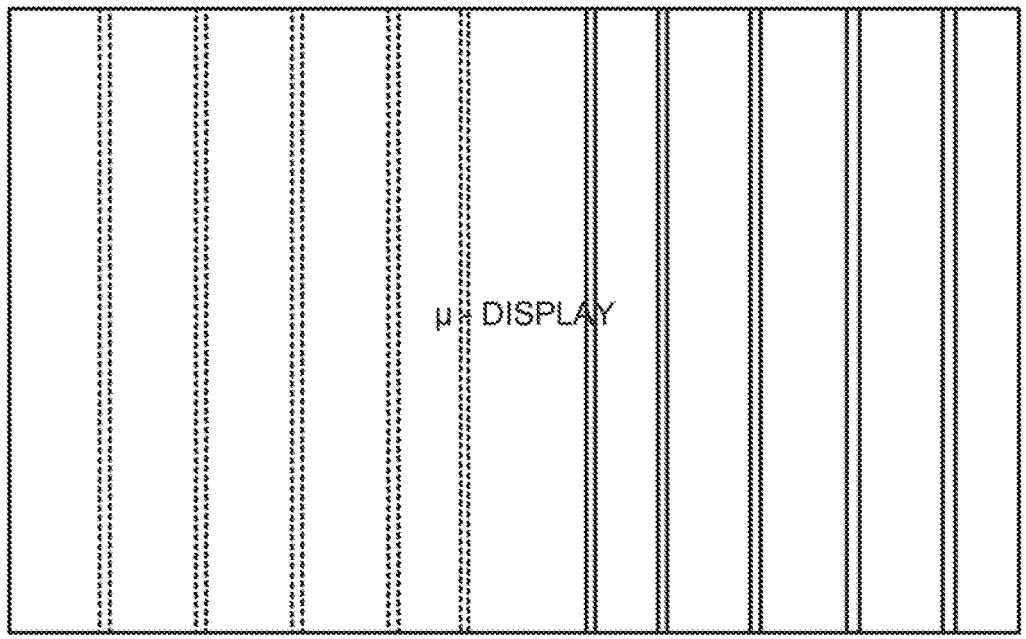
FIG. 3C is an example schematic diagram of the display depicting the two-way privacy control.

As shown in example front view 300B of FIG. 3A, columns 304 of the partition walls are disposed within supporting framework 302 when display 202 is operated in normal mode (i.e., when privacy mode is deactivated). As shown in front view 300B of FIG. 3B, control unit 212 may upwardly move columns 304 of the partition walls relative to supporting framework 302 to provide a two-way privacy control of the viewing angle of display 202 when a privacy mode of display 202 is activated. FIG. 3C is an example schematic diagram of display 202 depicting the two-way privacy control corresponding to FIG. 3B. In one example, FIG. 3C depicts a right view privacy control and a left view privacy control of display 202 corresponding to the privacy mode of FIG. 3B.

Figure 4A:
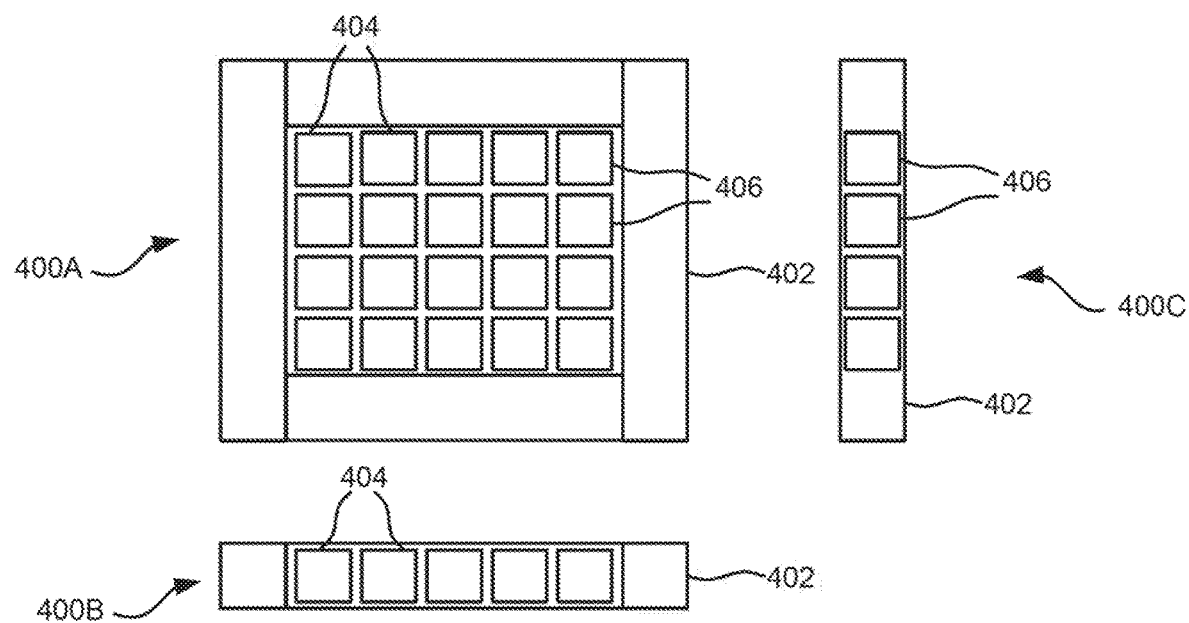
FIGS. 4A and 4B depict example schematic views of the privacy gate including a plurality of intersecting rows and columns of partition walls that can be moved up or down to provide a four-way privacy control.
Figure 4B:
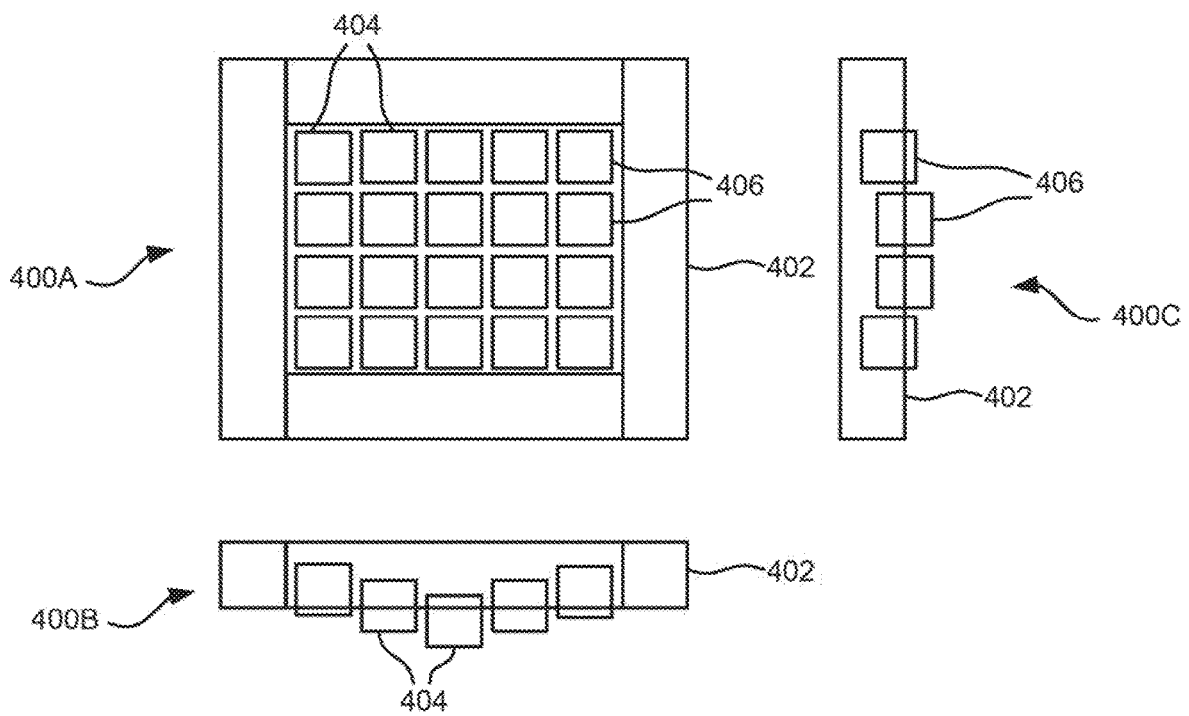

FIGS. 4A and 4B depict example schematic views of privacy gate 208 including a plurality of intersecting rows 406 and columns 404 of partition walls that can be moved up or down to provide a four-way privacy control, Particularly, FIGS. 4A and 4B illustrate a top view 400A, a cross-sectional front view 400B, and a cross-sectional side view 400C of privacy gate 208. As shown in FIG. 4A, privacy gate 208 may be a grid shaped structure comprising a plurality of intersecting rows 406 and columns 404 of the partition walls disposed by means of a supporting framework 402 to partition LED packages 206. Each LED package 206 may be accommodated in a respective space defined by intersecting rows 406 and columns 404 of the partition walls.

Figure 4C:
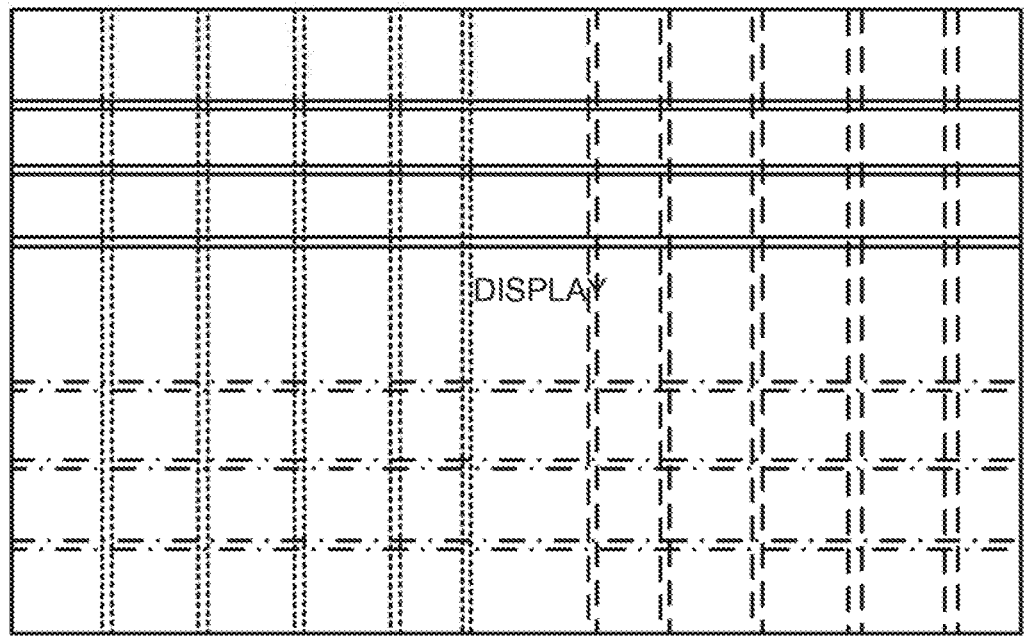
FIG. 4C is an example schematic diagram of the display depicting the four-way privacy control.

As shown in example front view 400B and side view 400C of FIG. 4A, rows 406 and columns 404 of the partition walls are disposed within supporting framework 402 when display 202 is operated in normal mode (i.e., when privacy mode is deactivated). As shown in front view 400B and side view 400C of FIG. 4B, control unit 212 may upwardly move rows 406 and columns 404 of the partition walls relative to supporting framework 402 to provide a four-way privacy control of the viewing angle of display 202 when a privacy mode of display 202 is activated. FIG. 4C is an example schematic diagram of display 202 depicting the four-way privacy control corresponding to FIG. 4B. In one example, FIG. 4C depicts a right view privacy control, a left view privacy control, a top view privacy control, and a bottom view privacy control of display 202 corresponding to the privacy mode of FIG. 4B. Example four-way privacy control may include the horizontal viewing angle control (i.e., the right view privacy control and the left view privacy control) and the vertical viewing angle control (i.e., the top view privacy control and the bottom view privacy control).

In other examples, control unit 212 may move the partition walls corresponding to either columns 404 or rows 406 up or down relative to supporting framework 402 to provide the horizontal viewing angle control or the vertical viewing angle control of display 202, respectively.

Control units 108 and 212 may include, for example, hardware devices including electronic circuitry for implementing the functionalities described herein. In addition or as an alternative, control units 108 and 212 may be implemented as a series of instructions encoded on a machine-readable storage medium of device (e.g., 100 and 200) and executable by processor. In examples described herein, the processor may include, for example, one processor or multiple processors included in a single device or distributed across multiple devices. It should be noted that, in some examples, some modules are implemented as hardware devices, while other modules are implemented as executable instructions.

Figure 5:
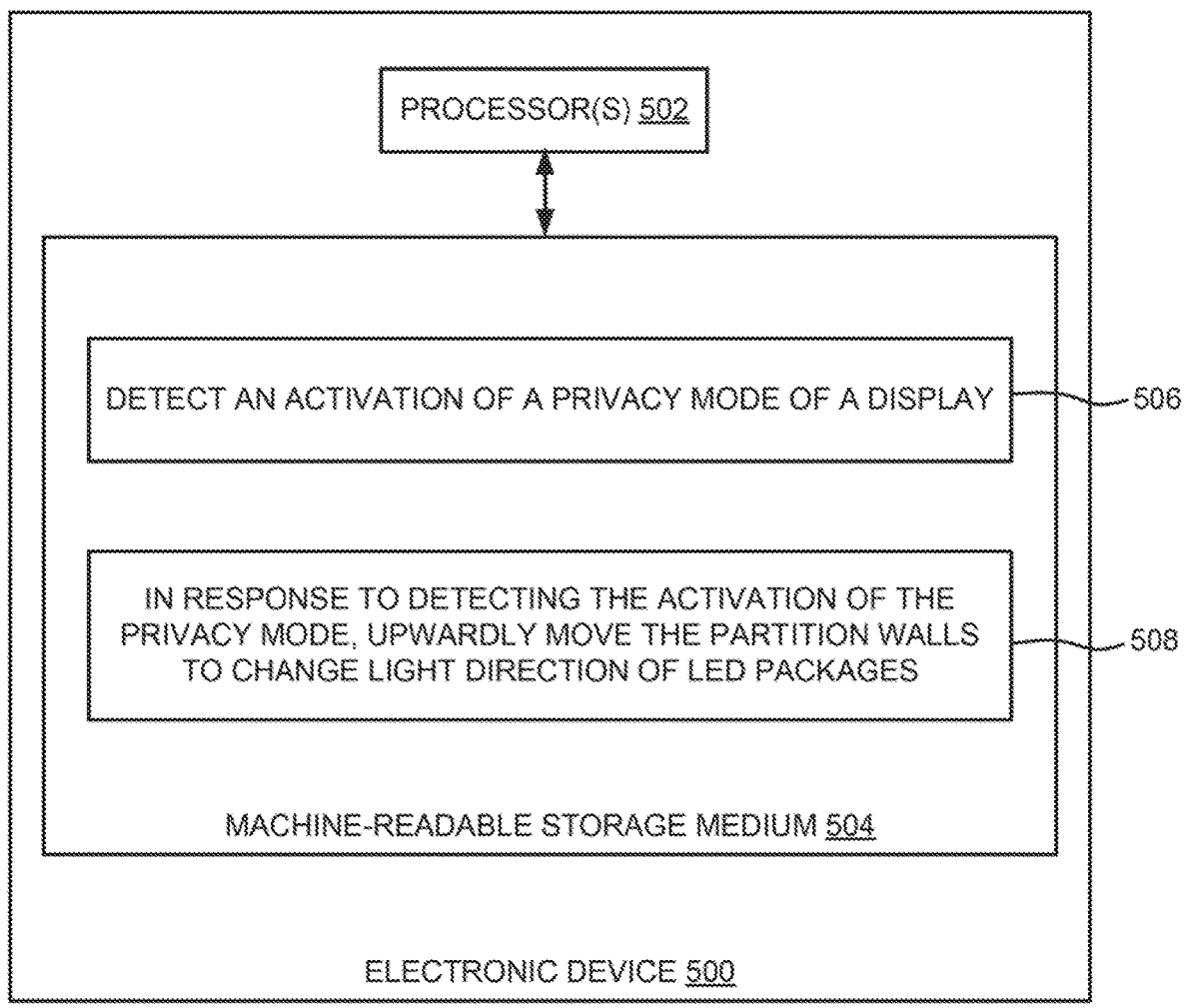
FIG. 5 depicts a block diagram of an example electronic device to implement a privacy mode of a display upon detecting an activation of the privacy mode.

FIG. 5 depicts a block diagram of an electronic device 500 to implement a privacy mode of a display upon detecting an activation of the privacy mode. Electronic device 500 may include a processor 502 and a machine-readable storage medium 504 communicatively coupled through a system bus. Processor 502 may be any type of central processing unit (CPU), microprocessor, or processing logic that interprets and executes machine-readable instructions stored in machine-readable storage medium 504. Machine-readable storage medium 504 may be a random-access memory (RAM) or another type of dynamic storage device that may store information and machine-readable instructions that may be executed by processor 502. For example, machine-readable storage medium 504 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, machine-readable storage medium 504 may be a non-transitory machine-readable medium. In an example, machine-readable storage medium 504 may be remote but accessible to electronic device 500.

Machine-readable storage medium 504 may store instructions 506 and 508. In an example, instructions 506 and 508 may be executed by processor 502 to control a viewing angle of the display when the privacy mode is activated or deactivated. Instructions 506 may be executed by processor 502 to detect an activation of a privacy mode of a display. In one example, the display may include arrays of light-emitting diode (LED) packages and a privacy gate having partition walls that partition each of the LED packages. For example, the display may include a plurality of μ-LEDs. For example, the privacy gate may be disposed between a backplane having integrated LED packages and a prism layer of the display. The partition walls may provide a first viewing angle of the display when the display is operated in a normal mode.

Instructions 508 may be executed by processor 502 to upwardly move the partition walls to change light direction of the LED packages to provide a second viewing angle of the display in response to detecting the activation of the privacy mode. The second viewing angle may be narrower than the first viewing angle. In other examples, machine-readable storage medium 504 may include instructions to receive an input to enable a second privacy mode of the display and upwardly move the privacy gate to change the light direction of the LED packages to provide a third viewing angle of the display. In this example, the third viewing angle is narrower than the second viewing angle.

In another example, the privacy gate may include partition walls arranged in rows and columns to partition each of the LED packages. In this example, Instructions 506 may be executed by processor 502 to:

a. upwardly moving the partition walls corresponding to the rows to control a vertical viewing angle of the display, b. upwardly moving the partition walls corresponding to the columns to control a horizontal viewing angle of the display, or c. upwardly moving the partition walls corresponding to the rows and columns to control the horizontal viewing angle and the vertical viewing angle of the display.

It may be noted that the above-described examples of the present solution are for the purpose of illustration only. Although the solution has been described in conjunction with a specific implementation thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is, defined in the following claims.

What is claimed is:

1. A display comprising:
    a plurality of spaced light emitting device packages;
    a privacy gate having partition walls to partition each of the plurality of spaced light emitting device packages;
    an optical film disposed above the privacy gate, wherein the optical film comprises an asymmetric turning film, an asymmetrical prism film, a prism film, a brightness enhancement film (BEF), a dual brightness enhancement film (DBEF), a diffuser, a polarizer film, a retardation film, or any combination thereof; and
    a control unit to selectively move the partition walls up or down relative to the plurality of spaced light emitting device packages to control a viewing angle of the display.

2. The display of claim 1, wherein the plurality of spaced light emitting device packages are arranged in columns and rows, and wherein each light emitting device package comprises at least one micro-light-emitting diode (μLED) pixel.

3. The display of claim 1, wherein the privacy gate is a grid shaped structure comprising a plurality of columns of the partition walls disposed by means of a supporting framework to partition the plurality of spaced light emitting device packages, and wherein each light emitting device package is accommodated in a respective space defined between the columns of the partition walls.

4. The display of claim 3, wherein the control unit is to move the plurality of columns of the partition walls up or down relative to the supporting framework to provide a two-way privacy control of the viewing angle of the display.

5. The display of claim 1, wherein the privacy gate is a grid shaped structure comprising a plurality of intersecting rows and columns of the partition walls disposed by means of a supporting framework to partition the plurality of spaced light emitting device packages, wherein each light emitting device package is accommodated in a respective space defined by the intersecting rows and columns of the partition walls.

6. The display of claim 5, wherein the control unit is to move the partition walls corresponding to the rows or columns up or down relative to the supporting framework to provide a two-way privacy control of the viewing angle of the display, and wherein the two-way privacy control comprises one of a horizontal viewing angle control and a vertical viewing angle control.

7. The display of claim 5, wherein the control unit is to move the partition walls corresponding to the rows and columns up and down relative to the supporting framework to provide a four-way privacy control of the viewing angle of the display, and wherein the four-way privacy control comprises a horizontal viewing angle control and a vertical viewing angle control.

8. An electronic device comprising:
    a display comprising:
        a backplane having a plurality of spaced light-emitting diode (LED) packages;
        a privacy gate having partition walls to partition each of the plurality of spaced LED packages, wherein the privacy gate is a grid shaped structure formed by a plurality of intersecting rows and columns of the partition walls, and wherein each LED package is accommodated in a respective space defined by the intersecting rows and columns of the partition walls; and
        an optical film disposed above the privacy gate, wherein the optical film comprises an asymmetric turning film, an asymmetrical prism film, a prism film, a brightness enhancement film (BEF), a dual brightness enhancement film (DBEF), a diffuser, a polarizer film, a retardation film, or any combination thereof; and
        a control unit to selectively move the partition walls up or down relative to the plurality of spaced LED packages to control a viewing angle of the display.

9. The electronic device of claim 8, comprising a substrate disposed on the optic film wherein the substrate is a glass substrate or a plastic substrate.

10. The electronic device of claim 8, wherein the control unit is to:
    move the partition walls corresponding to the rows up or down relative to the plurality of spaced LED packages to control a vertical viewing angle of the display;
    move the partition walls corresponding to the columns up or down relative to the plurality of spaced LED packages to control a horizontal viewing angle of the display; or
    move the partition walls corresponding to the rows and columns up or down relative to the plurality of spaced LED packages to control the horizontal viewing angle and the vertical viewing angle of the display.

11. The electronic device of claim 8, wherein the control unit is to control a degree of privacy on the display by moving the privacy gate to multiple positions corresponding to multiple privacy modes, and wherein each privacy mode is having a viewing angle that is different from the other privacy modes.

* * * * *